United States Patent [19]
Milton

[11] 3,801,106
[45] Apr. 2, 1974

[54] BOARD AND CARDS GAME

[76] Inventor: Charlotte M. Milton, 361 Laidley St., San Francisco, Calif. 94131

[22] Filed: Nov. 13, 1972

[21] Appl. No.: 305,805

[52] U.S. Cl. .............................. 273/161, 35/22 R
[51] Int. Cl. .............................................. A63f 9/18
[58] Field of Search.... 273/161, 152 R, 132, 135 R; 35/22 R

[56] References Cited
UNITED STATES PATENTS
2,557,400  6/1951  Van Asten .......................... 273/161
2,034,991  3/1936  Salinger ........................... 273/161 X OTHER PUBLICATIONS
Playthings, November 1970, pp. 56, 57.

Primary Examiner—Anton O. Oechsle
Attorney, Agent, or Firm—Julian Caplan

[57] ABSTRACT

A board is divided into a regular pattern of rectangular spaces, each consecutively serially numbered, space No. 1 being in the center of the pattern and the other numbers proceeding out from the center. In a preferred form, there are 33 spaces — five rows and five columns with outward extended spaces at each corner and at the middle of each row and column. Cards corresponding in number to the spaces are marked with different words, one card having the word "self." Preferably, the word bearing sides of the cards are different colors. After shuffling, the cards are placed face up on the numbers on the board in order. Questions of certain types may be answered by reading the words on the "self" card, the card on space No. 1 and two other cards which happen to have been placed in a certain relation with these two cards.

1 Claim, 8 Drawing Figures

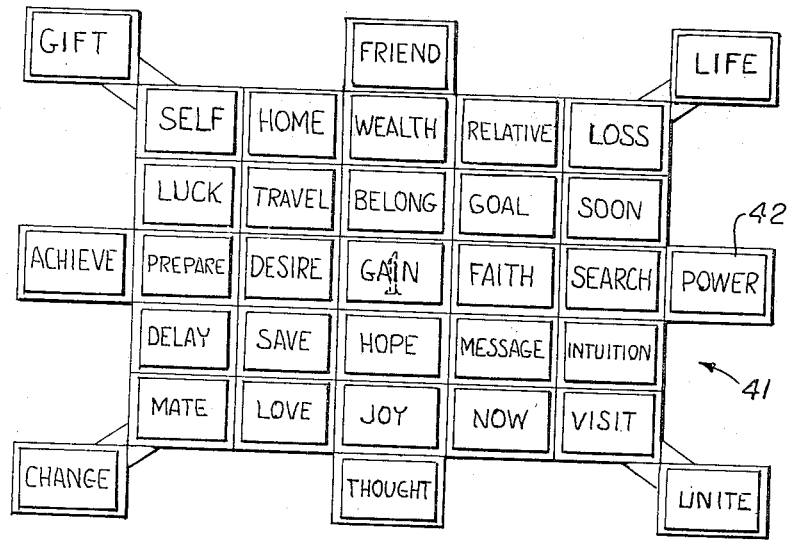
*Fig. 1*
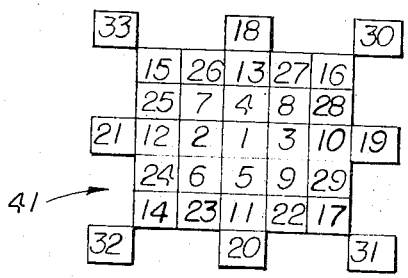
*Fig. 2*
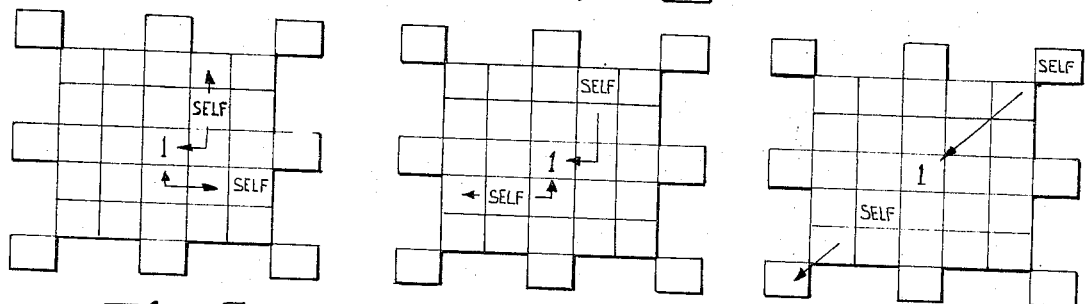
*Fig. 3*   *Fig. 4*   *Fig. 5*
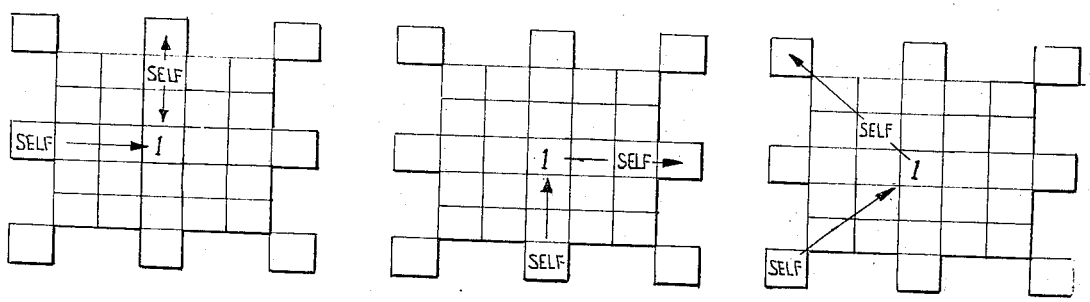
*Fig. 6*   *Fig. 7*   *Fig. 8*

BOARD AND CARDS GAME

This invention relates to a new and improved board and cards game. A principal object of the invention is to provide entertainment for one or more players.

Although entertainment is one of the chief purposes of the present invention, nevertheless, from the nature of the game it may help players to concentrate on specific personal problems and thus to release subconscious thoughts making possible a deeper understanding of the problem and its solution. In accordance with the invention, words are printed on cards which are arranged on a board in a pattern. By reading the words on certain cards, a message which suggests a solution for a question, or problem, is brought to the attention of the player. In addition to the printed words on the cards, the cards also are preferably printed with different colors having a significance for the words thereon which enhance the message derived from the words. The particular words, hereinafter listed in detail, are selected for constructive and informative meaning in accordance with playing of the game.

Other objects of the present invention will become apparent upon reading the following specification and referring to the accompanying drawings in which similar characters of reference represent corresponding parts in each of the several views.

In the drawings:

FIG. 1 is a schematic plan view of the board used in playing the game showing the pattern of numbers displayed on the rectangular squares of the board.

FIG. 2 is a view similar to FIG. 1 showing a pattern of cards having different words thereon which have been placed on the numbered spaces of the board in sequence in accordance with the rules of the game.

FIGS. 3-8, inclusive, are schematic views of the board in reduced scale showing the sequence in which the cards are read in relation to the card in the center of the board and the card marked "self."

Board 41 may be of any convenient size, thickness and material. It is divided into 33 rectangular spaces, each space being slightly larger than the size of a conventional playing card. It will be seen that there are five rows of five columns each in the central portion of board 41 and that there are four spaces extending diagonally outwardly from the corners of the five rows and columns and also four spaces extending outwardly from the middle of each row and column. The space in the center of the board 41 is numbered 1 and the other spaces are numbered in a pattern proceeding outwardly from the center. It will be understood that the numerical arrangement shown in FIG. 1 is representative and that the sequence of numbers may be varied.

There are 33 cards used with the game. Preferably, the backs of the cards are uniform and of any desired pattern. The faces of the cards bear certain words. Again, the particular words are subject to some variation, but in a preferred form of the invention the following 33 words are used:

| Achieve | Hope | Prepared |
| Belong | Intention | Relative |
| Change | Joy | Save |
| Delay | Life | Search |
| Desire | Loss | Self |
| Faith | Love | Soon |
| Friend | Luck | Thought |
| Gain | Marriage | Travel |
| Gift | Mate | Unite |
| Goal | Now | Visit |
| Home | Power | Wealth |

It will be noted that one of the cards is marked "self," and this card is important in the playing of the game.

In addition to being printed with different words, the individual cards may be tinted different colors, the colors being associated with the words on the cards.

In playing the game, the cards are held face down and shuffled, the player concentrating on a problem, thought or question which he wants answered. It is suggested that this is a game of relaxation, and hence the cards are shuffled until the dealer feels that he controls the cards and as he shuffles, he concentrates on some question or problem, repeating some key word which is associated with the question and problem. When the shuffling is completed, the cards are laid face up on the board starting with number 1 and proceeding until all of the cards have been placed on the board in order.

After all of the cards have been placed on the board, the dealer locates the card which reads "self." If this card appears in square No. 1 the problem is already solved and nothing needs to be done. However, usually the "self" card will not be located in the number 1 square. As is seen with reference to FIGS. 3-8, there are always two cards plus the No. 1 card associated with the "self" card in the patterns shown by the arrows in FIGS. 3-8. Each of the FIGS. 3-8 actually shows two different possibilities of arrangement of the "self" card, but this is merely for the purpose of reduction of the number of figures of the drawings to a reasonable limit. By repeating the three words associated with the card "self" in the patterns shown several times, an answer to the question or problem in the mind of the player becomes clear.

The words applied to the cards may be used in many ways. They have different meanings to different people in different situations. By way of example:

"Delay" represents a waiting period or a time for relaxation and can also mean not to use pressure. "Loss" and "Gain" are means of expressing minus and plus when associated with other words. "Loss" can also mean to give something up that at the time seems important to the questioner. When "Loss" or "Gain" are in the No. 1 square it indicates a decided "No" or "Yes."

"Wealth," when associated with "Hope," can mean unlooked for possibilities if the questioner can be optimistic in his outlook. When "Gain" is also associated with these two words, the problem will be solved in a hopeful outlook. By careful concentration and with daily use, the player can find new ways of solving daily problems.

When used as a group game, it allows the players to know the feelings of others in the group, their reaction to words in relation to the player. When using the game as a group game, the problems could be developed out loud as one member of the group associates the words with the thought.

Since most of the problems are concerned with the player, or his activities, the question thus asked is phrased by stating "what shall I do--." Impersonal questions such as "who will be elected President" cannot be answered in this game, but a question such as "what can I do to elect a President" is answerable.

What is claimed is:

1. A game comprising an irregular shaped board marked with 33 rectangular spaces in a regular pattern extending out from a center space there being five columns of five rows plus spaces at each corner and at the middle of each row and column, the perimeter of said board corresponding to the margins of the outermost spaces, each space being numbered, with the center spaced marked 1, and a plurality of rectangular cards corresponding in number to said spaces and each of a size to fit into one space and each marked with a different word, one said card carrying the word "self," the back of each card having a uniform pattern and the face being a different color.

* * * * *